United States Patent [19]
Kamimura et al.

[11] Patent Number: 5,187,663
[45] Date of Patent: Feb. 16, 1993

[54] SYSTEM USING A MOVING LIGHT REFLECTOR FOR DEFINING THE PERIPHERAL OUTLINE OF A WORK AREA

[75] Inventors: Kenji Kamimura; Sadachika Tsuzuki; Kazunori Noda, all of Saitama, Japan

[73] Assignee: Honda Giken Kogyo Kabushiki Kaisha, Tokyo, Japan

[21] Appl. No.: 592,633

[22] Filed: Oct. 4, 1990

[30] Foreign Application Priority Data

Oct. 25, 1989 [JP] Japan .................. 1-278067

[51] Int. Cl.$^5$ .......................... G06F 15/50; G01C 3/00
[52] U.S. Cl. ............................... 364/424.02; 364/505; 364/564; 180/167; 356/1
[58] Field of Search ...................... 364/424.01, 424.02, 364/505, 559-564, 449, 443, 444; 180/167-169; 250/560, 561; 318/587; 356/1, 375; 358/103

[56] References Cited

U.S. PATENT DOCUMENTS

| | | | |
|---|---|---|---|
| 4,600,997 | 7/1986 | Cain et al. | 364/562 |
| 5,019,990 | 5/1991 | Kamimura et al. | 364/449 |
| 5,025,377 | 6/1991 | Kamimura et al. | 364/449 X |
| 5,031,103 | 7/1991 | Kamimura et al. | 364/449 |
| 5,051,934 | 9/1991 | Wiklund | 364/561 |

Primary Examiner—Parshotam S. Lall
Assistant Examiner—Edward J. Pipala
Attorney, Agent, or Firm—Pollock, VandeSande and Priddy

[57] ABSTRACT

The present invention is characterized by the provision of a traveling course setting system for a moving vehicle comprising a light reflector that is moved along the peripheral outline of the work area for reflecting light in the direction of incidence, and a light beam generator mounted on the moving vehicle for circumferentially scanning a light beam around the moving vehicle. The system detects the distance between the moving light reflector and the moving vehicle and the azimuth of the moving light reflector relative to the moving vehicle on the basis of the light reflected from the moving light reflector, calculates the position of the moving light reflector based on the distance and azimuth with respect to the moving vehicle which are detected while the moving vehicle is stopped, stores the calculated position as a locus thereof, and sets a traveling course in the work area recognized on the basis of the stored locus of the moving light reflector. The travel locus of the light reflector, or the outline of the work area, can be recognized and a traveling course for the moving vehicle can be set in the work area while the vehicle is stopped.

10 Claims, 9 Drawing Sheets

SYSTEM USING A MOVING LIGHT REFLECTOR FOR DEFINING THE PERIPHERAL OUTLINE OF A WORK AREA

BACKGROUND OF THE INVENTION

1. Field of the Invention

The present invention relates to a traveling course setting system for a moving vehicle, and more particularly to a traveling course setting system for a moving automobile, a moving mobile carrying device in a factory, or a moving vehicle for use in agriculture, civil engineering machinery and the like.

2. Description of the Prior Art

A system for setting the traveling course of a moving vehicle as described above is described in, for example, Japanese Patent Laid-open No. 67476/1984 for detecting a self-position of a moving body by scanning a light beam emitted from the moving body in the circumferential direction centering around the moving body. In this system, retroreflective means Or light reflecting means for reflecting the light beam in precisely the same direction as the incident light are secured at at least three positions apart from the moving body, and the moving body is provided with a light beam source means, a light beam scanning means for scanning a light beam emitted from the light beam source means, and a beam receiving means for receiving light reflected from the light-reflecting means.

In the above system, differential azimuths between adjoining two light-reflecting means centering around the moving body are detected on the basis of received light output of the beam-receiving means, whereby a self-position of the moving body is calculated based on the detected angles and positional information of the light-reflecting means which have been previously set. The moving vehicle bearing the position detecting device travels while detecting the position Of itself so that it does not deviate from the traveling course preset in the work area In order to make the moving vehicle recognize the work area before commencing actual work, the following means (1) and (2) are employed.

(1) Means for inputting the coordinates and the referential points of the work area to be recognized through an operation of keys on the operator panel or indication by a pen for inputting coordinates on a display.

(2) Means for defining the coordinates of the work area and reference points indicating the work area to be recognized with the position detecting device or the like, by controlling the moving vehicle with radio control or the like to cause it to travel along the outer periphery of the actual work area, or by positioning the moving vehicle at the reference points indicating the work area.

The above-mentioned means have the following problems. In the means (1), the coordinates and/or the reference points must be known, and the input work of the coordinates is cumbersome. In addition, it is too expensive to mount display means on each moving vehicle to simplify the inputting operation. In the means (2), it is time consuming to make the moving vehicle recognize the coordinates and the referential points, and in addition the radio control operation of the moving vehicle is not easy for those other than skilled persons. Further, since the travel position of the moving vehicle (the position at which the moving vehicle exists) becomes harder to recognize from a remote place as the work area becomes wider, it is very difficult to move the moving vehicle along the peripheral outline of the work area unless the operator performs the radio control operation while walking along with the moving vehicle.

As a countermeasure to these problems, for instance, Japanese Patent Laid-open No. 150914/1989 discloses a teaching method of an automatic working vehicle wherein a work area can be taught or changed without relying on human assistance. In this teaching method, the work area is recognized by sequentially moving the working vehicle toward the nearest reflecting means, or the reflecting means having the smallest azimuth with respect to the front direction of the moving vehicle.

If there are obstacles such as trees or ponds in the work area, the actual work area for the working vehicle must be set up so as to detour around these obstacles, which complicates the geometry of the work area. If the work area has a complex geometry, or if the work area is set up in a complex landform, a large number of reflecting means must be located to make the moving vehicle recognize the work area with such teaching method as mentioned above.

In this teaching method, the work area is recognized by sequentially moving the working vehicle toward the nearest reflecting means, or the reflecting means having the smallest azimuth, so there is a problem that the positional condition for disposing the reflecting means is restricted to assure that the Outer periphery of the work area can reliably be recognized.

If there are a lot of reflecting means and those reflecting means are placed irregularly, there is also a problem that, when the steering control is made on the basis of the positional information of the recognized work area or the reflecting means, the selection of the referential reflecting means becomes complicated.

SUMMARY OF THE INVENTION

It is an object of the present invention to overcome the above problems of the prior art and provide a system for setting a traveling course of a moving vehicle, wherein the work area can be recognized using movable reflecting mean which can be moved along the outline of the work area, other than the fixed reflecting means used for the steering control, so that the selection of reference points for the steering control is not affected, and a traveling course can be set up in the recognized work area.

The present invention is characterized by the provision of light-reflecting means moved along the peripheral outline of the work area for reflecting light in the direction of incidence, light beam generating means mounted on the vehicle for circumferentially scanning a light beam around the vehicle, means for detecting the distance between the moving light-reflecting means and the vehicle and the azimuth of the moving light-reflecting mean relative to the vehicle on the basis of the light reflected from the moving light-reflecting means, means for calculating successive positions of the moving light-reflecting means based on the distance and azimuth of the light-reflecting means with respect to the vehicle which are detected while the moving vehicle is stopped, means for storing the calculated position as a locus thereof, and means for setting a traveling course in the work area whose periphery is defined on the basis of the stored locus of the moving light-reflecting means.

In the present invention having the above features, the travel locus of the light reflecting means, Or the outline of the work area, can be recognized and a traveling course for the moving vehicle can be set in the work area while it is stopped.

DETAILED DESCRIPTION OF THE PREFERRED EMBODIMENTS

Figure 11:
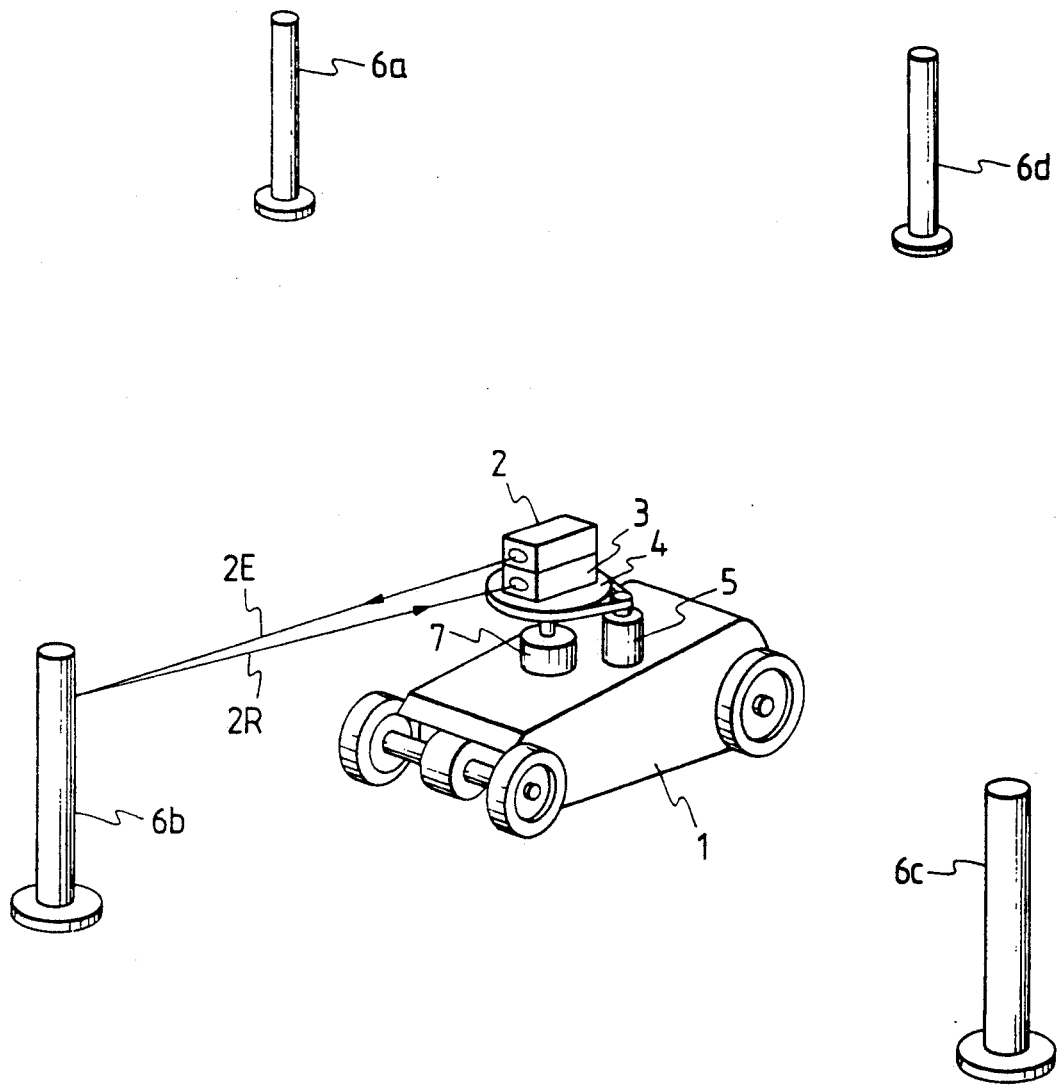
FIG. 11 is a perspective view of the moving vehicle and the reflectors

An embodiment of the present invention will be described hereinbelow by referring to the accompanying drawings. FIG. 11 is a perspective view of a moving vehicle carrying the traveling course system according to the present invention and each of several fixed position light reflectors disposed around an area in which the moving vehicle travels.

In FIG. 11, the moving vehicle i is one for use in an agricultural application such as a lawn mower and the like. A rotating table 4 driven by a motor 5 is mounted on the upper part of the moving vehicle I. The rotating table 4 mounts a light beam source 2 for emitting light beam 2E and a light beam receiver 3 for receiving a light beam 2R reflected by each of the reflectors 6a-6d. The light beam source 2 is provided with a light beam emitting means (light-emitting diode) and the light beam receiver 3 is provided with a means for receiving incident light to convert it into an electrical signal (photo-diode) (both of them are not shown). Furthermore a rotary encoder 7 is disposed so as to be engaged with a drive shaft of the rotating table 4, so that when pulses output from the rotary encoder 7 are counted, a turning angle of the rotating table 4 can be detected.

The fixed position reflectors 6a-6d are located outside of a working area of the moving vehicle 1. Each of the reflectors 6a-6d is a retroreflective means, e.g., a so-called corner cube prism which has been conventionally available on the market and the like may be used.

Moving vehicle 1 has a controller (not shown) provided with operation means for calculating the azimuth of each reflector 6a-6d with respect to the advance direction thereof and the distance between moving vehicle 1 itself and each reflector 6a-6d. The controller calculates the azimuth on the basis of the rotational angle of the rotating table 4, and the distances are calculated on the basis of the differences between the phase of the light beam emitted from beam source 2 and the phases of the reflected light returning from reflector 6a-6d.

Figure 3:
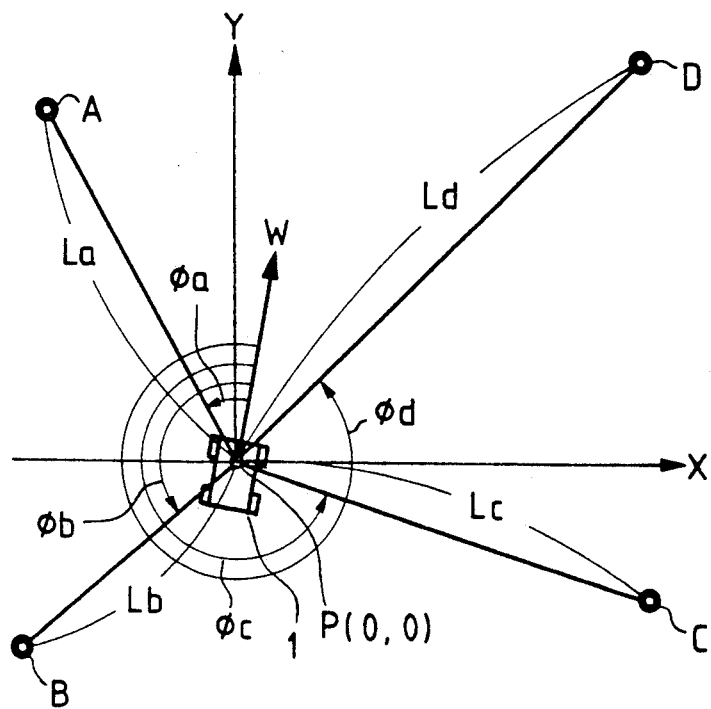
FIG. 3 is a diagram for explaining the principle of detecting a position of a moving vehicle.
Figure 4:
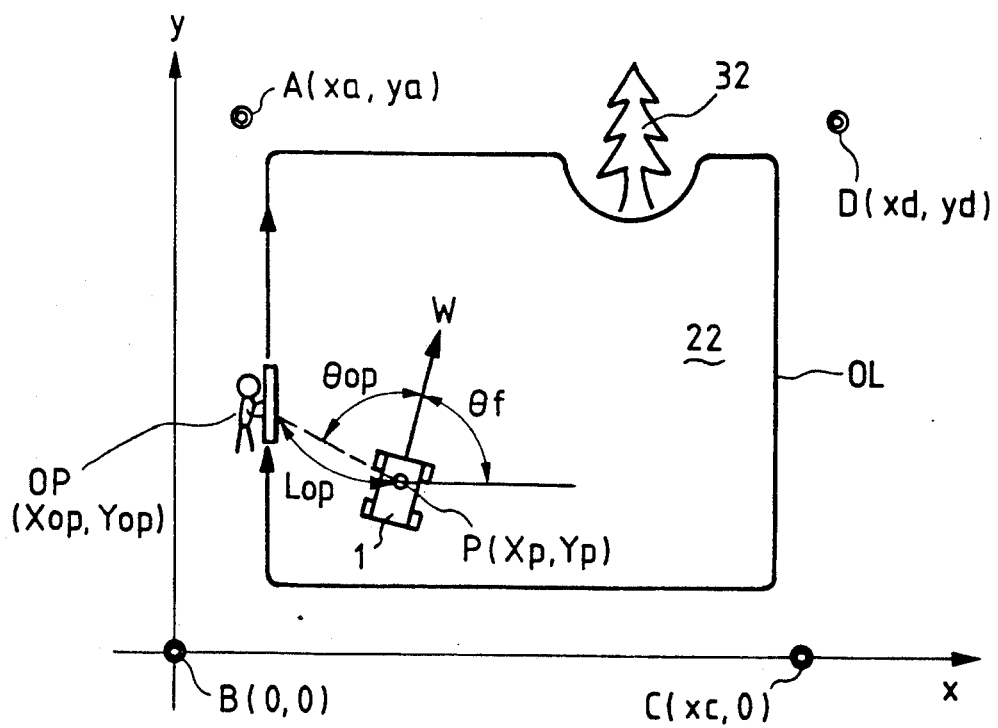
FIG. 4 is a diagram for explaining the procedure for recognizing a work area.

Now, an embodiment of the present invention will be described which makes the steering controller of moving vehicle 1 recognize the work area. FIG. 3 is a diagram for explaining the procedure for detecting the position of moving vehicle 1, and FIG. 4 is a diagram for explaining the procedure for recognizing the work area.

In FIG. 3, reference points A-D are provided outside the periphery of a place in which the work area is to be set up, and moving vehicle 1 is placed at an arbitrary position in which the vehicle 1 has an unobstructed view of the reflectors 6a-6d, which are disposed on the reference points A-D, respectively. The X- and Y-coordinates are coordinate axes which were arbitrarily established with point P as the origin, at which moving vehicle is placed. The coordinate system having the coordinate axes X and Y is called here a primitive coordinate system.

In the same figure, distances $L_a$-$L_d$ from moving vehicle 1 to each reference point A-D, and the azimuth $\phi_a$-$\phi_d$ of each reference point A-D on the basis of the front direction W of moving vehicle 1 are calculated by the operation means to be described with reference to FIG. 11, and the coordinates of each reference point A-D on the primitive coordinate system are determined from the result of this calculation.

Then, with reference point B as the origin, this primitive coordinate system is coordinate-transformed to an execution coordinate system (see FIG. 4) with the line passing through the origin B and reference point C as the X-axis, thereby defining the position P ($X_p$, $Y_p$) of moving vehicle 1 on this coordinate system. The procedure for defining the position P ($X_p$, $Y_p$) of moving vehicle 1 by the coordinate transformation is described in U.S. Pat. Ser. No. 344574, now Noji U.S. Pat. No. 5,011,288 issued Apr. 30, 1991, so its detailed explanation is omitted.

In FIG. 4, the reflectors 6a-6d are placed at reference points A, B, C and D. and the positions of moving vehicle 1, work area 22, and an object 32 outside of the work area 22 are represented in a coordinate system with point B as the origin, and with the line passing through points B and C as the X-axis.

As shown in FIG. 4, work area 22 is set up in a geometry excluding obstacle (tree) 32. To make the steering controller of moving vehicle 1 recognize the outline of such work area 22, first a light beam is scanned in the circumferential direction centering around moving vehicle 1. With this condition, when operator OP having a retroreflective means similar to the reflectors 6a-6d moves along the peripheral outline of the work area 22, the reflected light from the retroreflective means carried by operator OP is detected by beam receiver 3 mounted on moving vehicle 1, and azimuth $\theta_{op}$ of the moving retroreflective means or operator OP in regard to the front direction W of the moving vehicle 1 and the distance $L_{op}$ between the moving vehicle 1 and the moving retroreflective means OP are calculated by the operation means. The front direction W of the moving vehicle I is defined by azimuth $\theta_f$ in regard to the X-axis.

Based on the position ($X_p$, $Y_p$) and azimuth $\theta_f$ of the moving vehicle, and azimuth $\theta_{op}$ and distance $L_{op}$ of the moving retroreflective means OP, the position of moving retroreflective means OP can be detected according to the following equations.

$$Xop = Lop \times COS(\theta f + \theta op) + Xp \quad (1)$$

$$Yop = Lop \times SIN(\theta f + \theta op) + Yp \quad (2)$$

If the results of its positional detection are stored as the moving retroreflective means OP moves, the outline OL of the work area 22 can be recognized when the moving retroreflective means OP finishes traveling around work area 22. However, it is possible that,. if moving retroreflective means OP is moving on substantially the same straight line, the previous detection result is renewed with the newly detected current data, and that, only if the traveling course deviates from the straight line, the new current detection data is stored, leaving the previously stored data. That is, the movement of the moving retroreflective means becoming a complex locus can be approximated to a polygon and stored. This can minimize the number of stored positional detection data of the moving retroreflective means. Of course, all the detected data may be stored if it is unnecessary to save the storage capacity.

Next, the control system in the present embodiment will be described in accordance with the block diagram of FIG. 1 wherein the light beam 2E emitted from the beam source 2 is scanned in a rotating direction of the rotating table 4 and the light beam is reflected by a retroreflective means op which is carried by an operator. The light beam 2R reflected by the reflector op is introduced into the beam receiver 3. In a distance detection means 8, the distance Lop between the moving vehicle 1 and the operator or the retroreflective means is calculated in a suitable manner based on a difference between a phase of the light beam projected from the beam source 2 and that of the reflected light returning to the beam receiver 3.

In a counter 9, the number Of pulses output from the rotary encoder 7 is counted in accordance with rotation of the rotating table 4 and, supplied with a timing signal defining the front direction W of the moving vehicle 1, the counter 9 outputs a pulse count value to azimuth detecting means 31. In the azimuth detecting means 31, azimuth $\theta op$ of the moving retroreflective means OP is calculated on the basis of the inputted count value.

In a calculator 23 for calculating the position of moving retroreflective means op data representing distance Lop to the moving retroreflective means, azimuth $\theta op$, position P (Xp, Yp) and direction $\theta f$ of the moving vehicle I are supplied, and based on these data, position OP (Xop, Yop) of the moving retroreflective means is calculated using the previously stated equations (1) and (2). The position P and direction of of the moving vehicle I are calculated in position and advance direction operation means 13 which is described later with reference to FIG. 2, and supplied to the calculating means 23. The calculation result of calculator 23 is supplied to means 24 for storing the position of the moving retroreflective means. However, if the difference between the previously stored moving retroreflective means position and the latest calculated position is small and as a result, the amount of movement of the moving retroreflective means is determined to be less than a predetermined amount in movement discrimination means 27, the calculation result of calculator 23 is not provided to storage means 24.

In straight line calculation means 28, based on the moving retroreflective means position calculated in calculator 23 and the latest stored position of the retroreflective means, an equation of a straight line passing through both positions is calculated. In deviation detection means 29, the deviation of a position calculated in 23 is detected with respect to the straight line If the deviation is smaller than a predetermined value, the previously stored data are renewed with the latest calculated data, while if the deviation is larger than the predetermined value. the latest calculation result is stored, leaving the previously stored data.

Means for detecting recognition completion 30 detects if the position of the moving retroreflective means calculated in calculator 23 is approximately equal to the position which was first stored in memory means 24, and outputs a recognition completion signal of the work area.

With the above described arrangement, the movement locus of the moving retroreflective means OP or the outline of the work area 22 is recognized.

To determine the traveling course in the work area 22, in means 25 for setting X-coordinates of traveling course the X-coordinates of a plurality of straight courses constituting the traveling course are calculated from the data in the memory means 24, and based on the said X-coordinates and the stored data in memory means the start and terminal positions of each straight course are respectively calculated in a course terminal calculation means 26. The X-coordinates of the straight courses and the calculation result in the course terminal calculation means 26 are inputted to a traveling course setting means 16

Figure 1:
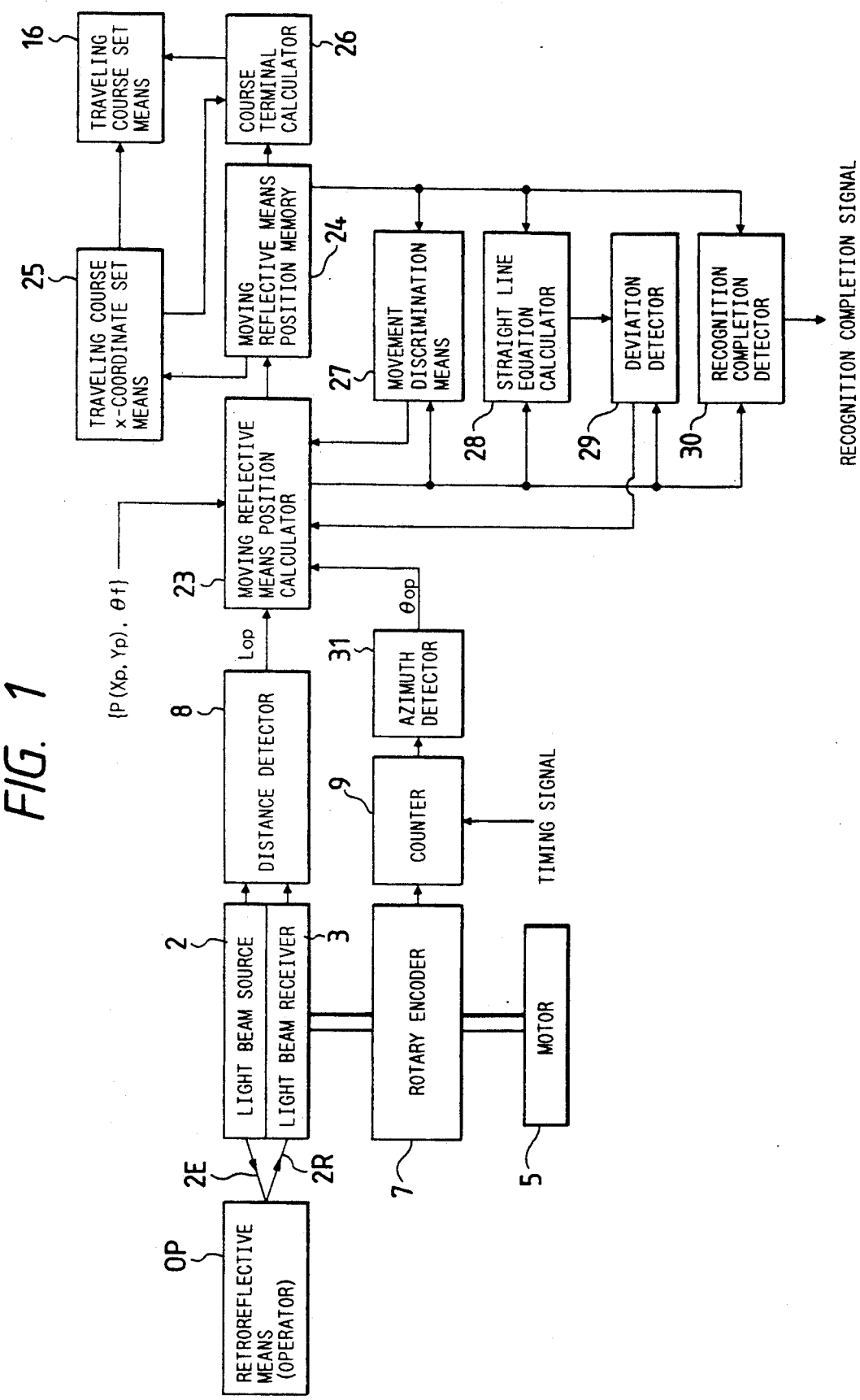
FIGS. 1 and 2 are block diagrams showing one embodiment of the present invention.
Figure 2:
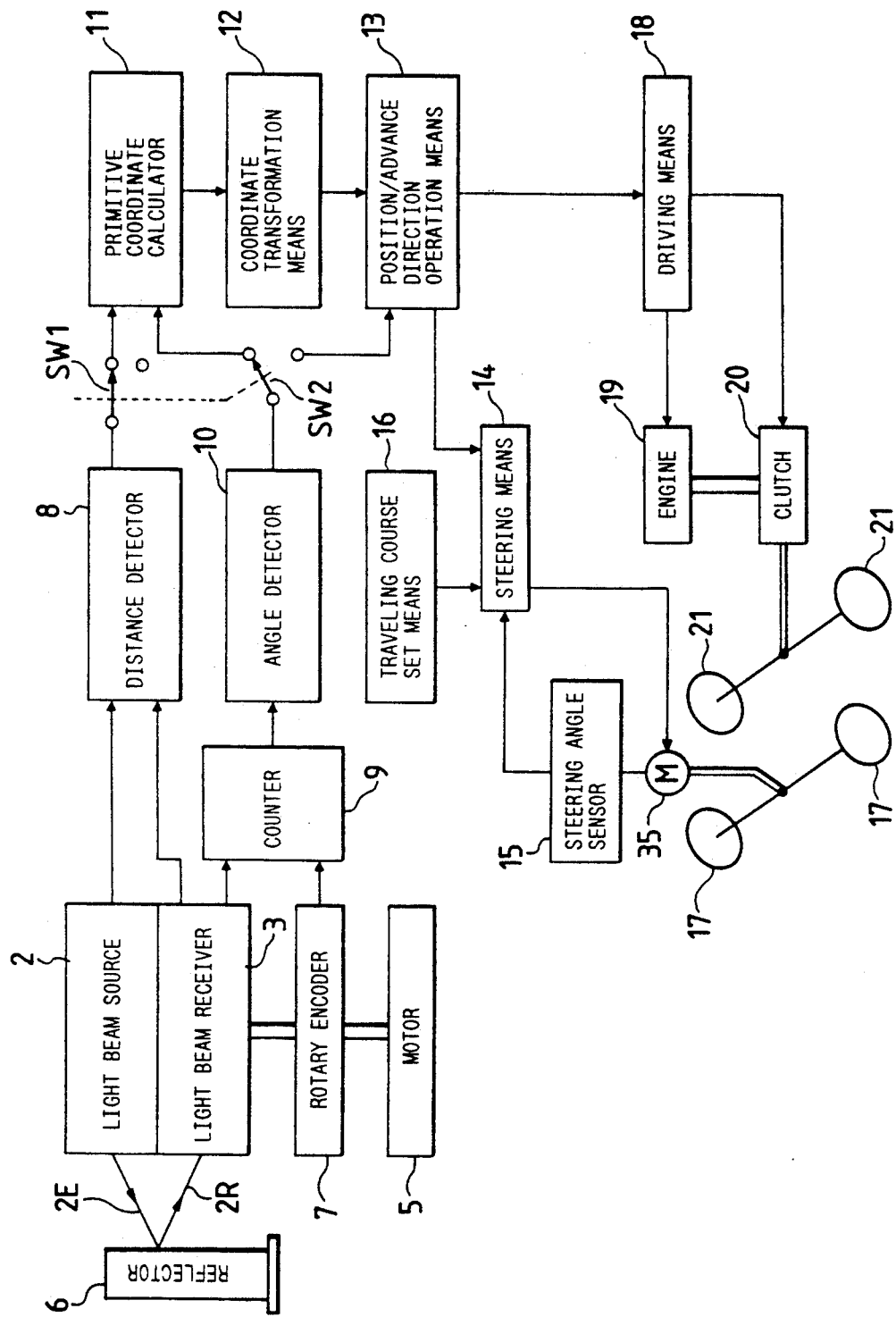

Described below is the construction of the steering control system for causing moving vehicle 1 to travel along the traveling course including the straight courses FIG. 2 is a functional block diagram of the steering control system, in which the same symbols as FIG. 1 represent the same or identical portions.

In FIG. 2, the light beam 2R reflected by any one of reflectors 6(6a–6d) is directed to the light beam receiver 3. Output pulses from the rotary encoder are counted by the counter 9 and the counted number of the pulses is transferred to an angle detection means 10 whenever reflected light is received by the beam receiver 3. In the angle detection means 10, each angle defined between the adjoining two reflectors 6a–6d, respectively, viewed from the moving vehicle i, i.e., the differential azimuth is calculated on the basis of the counted number of the pulses transferred upon every reception of the reflected light beam In a primitive coordinate calculation means 11, coordinates of the reflectors 6 in a coordinate system which is defined by adopting the moving vehicle 1 as the origin (hereinafter referred to as "primitive coordinate system" in the present specification) are obtained from the results of the calculation of the distance as well as the differential azimuths in the distance detection means 8 and the angle detection means 10. In a coordinate transformation means 12, the coordinate is transformed to a system of coordinates in which any one of the plural reflectors 6a–6d is defined as the origin (hereinafter referred to as "execution coordinate system" in the present specification) on the basis of a value of coordinates calculated in the primitive coordinate calculation means 11.

In a position-advance direction operating means 13, the position P(Xp, Yp) and the advance direction $\theta f$ off the moving vehicle 1 are calculated, and the results inputted to a steering means 14 In the steering means 14, the calculated results sent from the position-advance direction operating means 13 are compared with a traveling course which has been preset at a traveling course Setting means 16, and a steering motor (M) 35 connected to front wheels 17 of the moving vehicle is driven on the basis of the above-mentioned comparative results. The angle of steering for the front wheels 17 driven by the steering motor 35 is detected by means of a steering angle sensor 15 mounted on the front wheels of the moving vehicle 1, and the value detected is fed back to the steering means 14

A driving means 18 controls starting and stopping of an engine 19 as well as operation of a clutch 20 for transmitting the power of the engine 19 to rear wheels 21

Switches SW1 and SW2 are switched in an interlocking manner. After the calculation of an execution coordinate system has been performed, the position of the moving vehicle 1 on the execution coordinate system is calculated only based on the information of the differential azimuth from the angle detection means 10.

Figure 8:
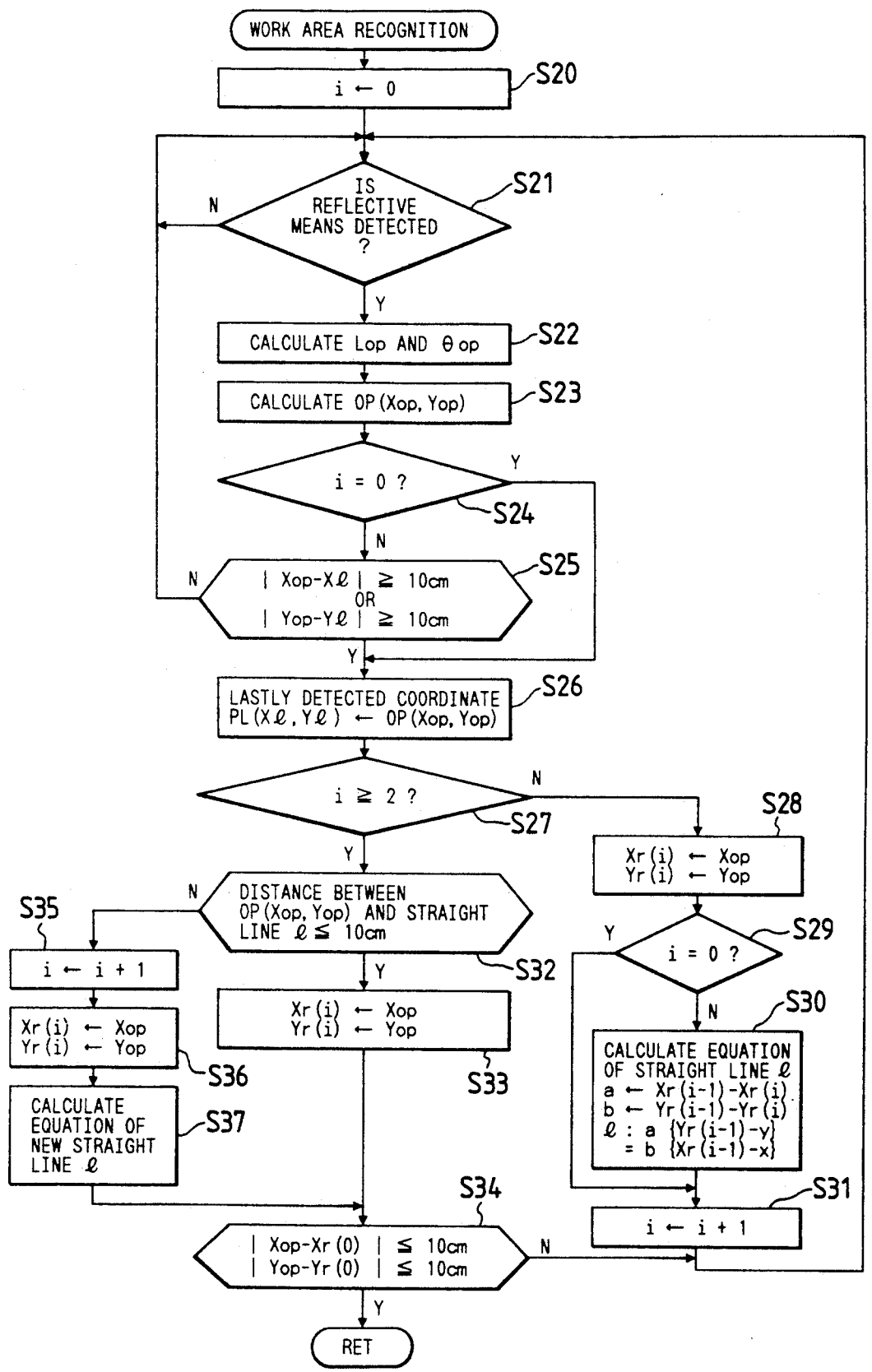
FIG. 8 is a flowchart showing the operation of recognizing the work area.

The work area recognition operation of the present embodiment is described according to FIG. 8 which is a flowchart showing the work area recognition operation In step S20, "0" is set as a value i representing the number of stored positions Of the moving retroreflective means OP which are detected.

In step S21, it is determined whether or not the moving retroreflective means OP has been detected, and if the reflected light from the moving retroreflective means has been detected, step 22 is entered.

In step S22, the distance Lop from the moving vehicle 1 to the moving retroreflective means OP and the azimuth $\theta$op thereof are calculated, and in the succeeding step S23, the position OP (Xop, Yop) of the moving retroreflective means is calculated on the basis of the distance Lop and azimuth $\theta$op, and the position P (Xp, Yp) of moving vehicle 1 and equations (1) and (2).

In step S24, it is determined whether or not the number i of stored positions is "0". Since "0" has been set as the number i in step S20 determination in, the step 24 is positive, and step S25 is skipped and step S26 is entered.

In step S26, the position OP (Xop, Yop) of the moving retroreflective means calculated in the step S23 is stored as the lastly detected coordinate PL (X1, Y1)

In step S27, it is determined whether or not the stored number i of the positions of the moving retroreflective means OP equals 2 or more. The determination in step S27 is negative until the storage number i becomes 2, and the processing goes to step S28. In step S28, the position OP (Xop, Yop) of the moving retroreflective means calculated in the step S23 is stored. In step S29, it is determined whether or not the number of storages i is "0". Since "0" has been seen as the number i in step S20 determination in, the step S29 is positive, and the operation skips step S30 and proceeds to step S31.

In step S31, "1" is added to the storage number i, and the operation returns to step S21.

If the moving retroreflective means OP has been detected at least once, the determination in step S24 becomes negative in the next cycle and step S25 is entered.

In step S25, it is determined whether Or not the moving retroreflective means OP has moved a predetermined distance (e g. 10 cm) or more, that is, whether or not the difference between the lastly detected coordinate (X1, Y1) and the currently detected coordinate (Xop, Yop) has exceeded, for instance, 10 cm in at least either coordinate value of X- or Y-coordinates.

If the moving retroreflective means OP has traveled 10 cm or more, the operation proceeds to step S26 otherwise it returns to step S21.

If the position of the moving retroreflective means OP is stored at least once, the determination result of step S29 also becomes negative and the processing advances to step S30. In step S30, the equation of a straight line 1 passing through the lastly stored coordinated [Xr(i−1), Yr(i−1)] which has been stored in step S28 and the currently detected coordinate [Xr(i), Yr(i)] is calculated. The calculating equation is shown in the flowchart.

Further, if i becomes 2 or more and the determination result of step S27 becomes positive, the processing goes to step S32, where it is determined whether or not the deviation of the currently detected position of the moving retroreflective means from the straight line 1 (the distance from the current retroreflective means position to the straight line 1) is within a predetermined value (e.g. 10 cm). That is, it is determined whether the moving retroreflective means is moving on a straight line portion or on a curved line portion.

If the determination in step S32 is positive and or is determined that the moving retroreflective means is moving on a straight line portion, when the processing flows to step S33 where the position OP of the moving retroreflective means OP is renewed with the latest or currently measured values (Xop, Yop)

On the other hand, if the determination in step S32 is negative and it is determined that the moving retroreflective means OP has approached a curved portion, the storage number i is incremented by one in step S35, and in step S36, the latest measured position OP (Xop, Yop) of the moving retroreflective means OP is stored. In this way, if the position of the moving retroreflective means OP deviates from the straight line defined by the equation calculated in step S30, the number of storages i is increased by one.

In step S37, the equation of a new straight line is calculated on the basis of the lastly stored coordinate and the currently stored coordinate The calculating equation is the same as in step S30.

In step S34, it is determined whether or not the deviation of the latest or current position of the moving retroreflective means OP from the position of the moving retroreflective means which has been first stored is within a predetermined value (e.g. 10 cm), that is, the difference between the first stored coordinate [Xr(0), Yr(0)] and the currently detected coordinate (Xop, Yop) is within 10 cm. If the deviation of the position is within the predetermined range, it is determined that the moving retroreflective means OP has traveled around the work area, and the work area recognition processing is terminated.

Figure 5:
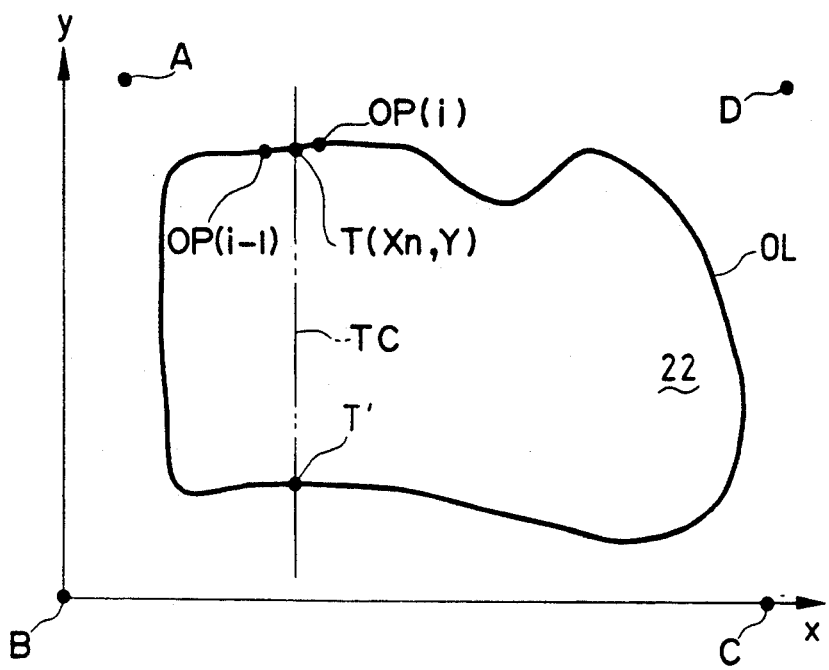
FIG. 5 is a diagram showing an example of the work area.
Figure 6:
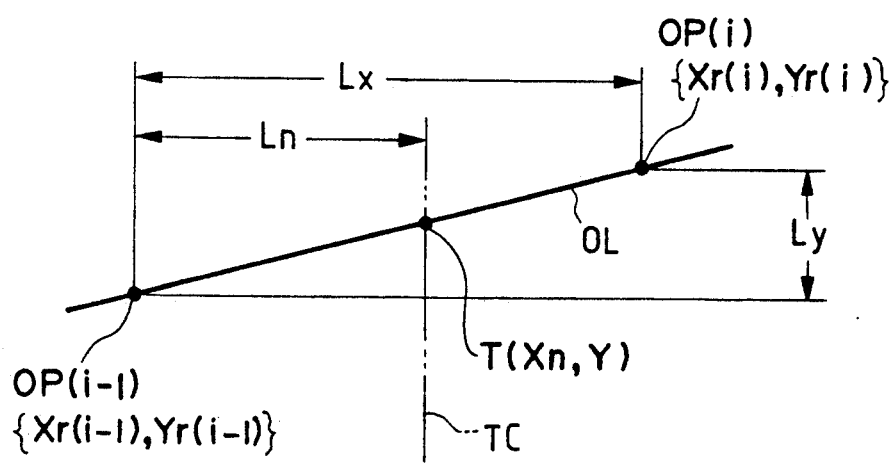
FIG. 6 is an enlarged diagram of the intersections of the work area and a straight traveling course.
Figure 9:
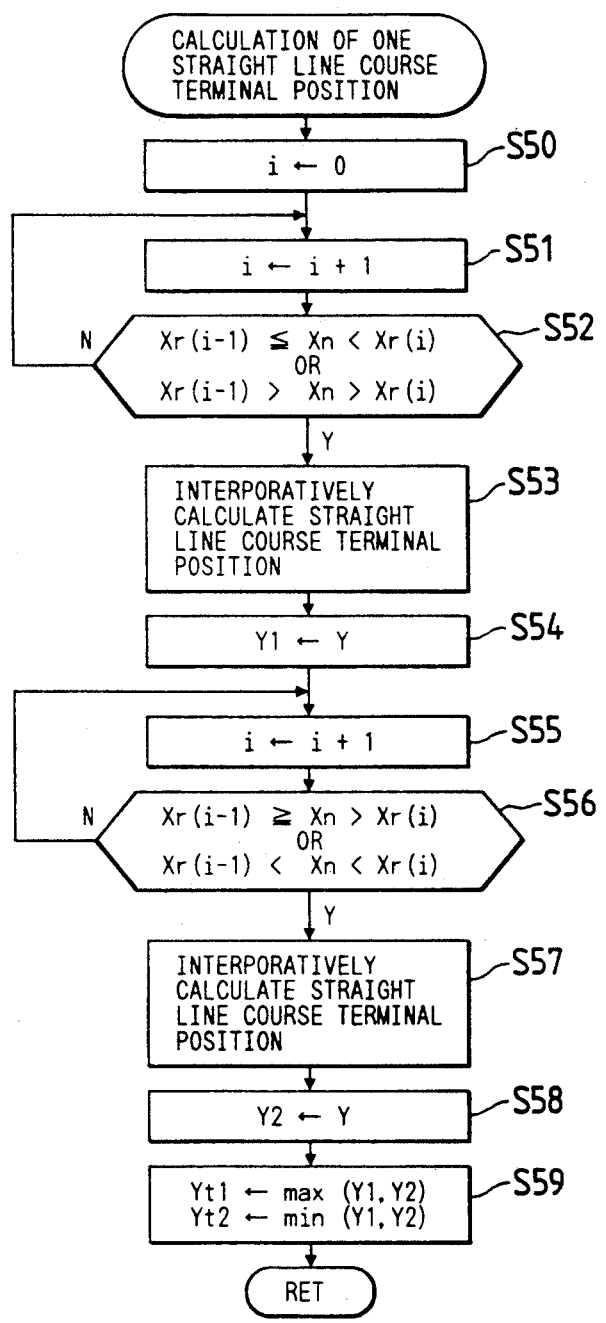
FIG. 9 is a flowchart showing the procedure for setting the traveling course.

Now, description is made of the operation for determining the termination position of a straight line portion of the traveling course set in the work area which is recognized by the above processing. FIG. 9 is a flowchart showing the procedure for setting the termination position of a straight line course, FIG. 5 is a diagram showing an example of the work area, and FIG. 6 is an enlarged view showing the intersection portion of the outline of the work area with the straight line course. Point T represents one intersection of the straight line course TC with the outline of the work area, and points OP(i−1), OP(i) represent the two stored points of the moving retroreflective means OP positions existing just before and after the point T Here, description is made by taking as an example the case of calculating the positions of both terminal ends of one straight line course of a plurality of traveling courses, which are set in parallel with the Y-axis with a predetermined interval L. The calculation is performed on the basis of, for instance, two positions OP(i−1), OP(i) of the moving retroreflective means OP, which are just before and after the point T where straight line course TC intersects with the outline OL of the work area 22 and which have been already detected and stored.

In step S50, the value 1 indicating the number of storage of the positions of the moving retroreflective means OP is set to "0", and the value i is incremented by one in step S51.

In step S52, it is determined whether or not the X-coordinate Xn of a particular traveling course to be set is lying between the respective X coordinates of the position [Xr(i−1), Yr(i−1)] of the moving retroreflective means OP stored in the work area recognition processing and the position [Xr(i), Yr(i)] of it subsequently stored immediately thereafter.

By the determination in step S52, it is possible to retrieve the stored positions Xr(i−1) and Xr(i) of the moving retroreflective means Op which exist just before and after the particular one point T at which the straight line course TC intersects with the peripheral outline OL of the work area. If the determination result of step S52 is positive, &he Y-coordinate of one of the particular straight line course terminal ends is obtained by an interpolatory calculation in step S53. The equation for the interpolarory calculation is described later with reference to FIG. 6.

In step S54, the Y-coordinate obtained by the interpolatory calculation in step S53 is stored as Y-coordinate Y1 of one terminal end of the straight line course, and the value i representing the number of storage Of the positions of the moving retroreflective means is incremented by one in step S55.

In step S56, in order to detect the stored position of the moving retroreflective means OP that is just before and after point T′ on the opposite side at which the aforesaid particular straight line course intersects with the outer periphery of work area 22, it is determined whether or not the X coordinate Xn of the aforesaid one straight line course lies between the position [Xr(i−1). Yr(i−1)] of the moving retroreflective means stored in the work area recognition processing and the subsequently stored position [Xr(i), Yr(i)] of the moving retroreflective means OP If the determination result of the step S56 is positive, the Y-coordinate of the opposite terminal end of the aforementioned one straight line course is obtained by another interpolatory calculation in step S17.

In step S58, the Y-coordinate obtained by the interpolatory calculation is stored as Y-coordinate Y2 of the opposite terminal end of the aforementioned one straight line course.

In step S59, the larger one of coordinates Y1 and Y2 is set as one terminal end Ytl Of the aforesaid one straight line course, and the smaller one is set as the Other terminal end Yt2 of the straight line course.

The equations for the interpolatory calculation are shown below The symbols used in the equations are shown in FIG. 6 where a position of the moving retroreflective means OP which has stored in the memory means 24 ar a certain point of time is designated as OP(:). and another position stored immediately before OP(i) is designated as OP(i−1).

$$Lx = Xr(i) - Xr(i-1) \quad (3)$$

$$Ln = Xn - Xr(i-1) \quad (4)$$

$$Ly = Yr(i) - Yr(i-1) \quad (5)$$

based on the equations (3), (4) and (5)

$$Y = Yr(i-1) + Ly \times (Ln/Lx) \quad (6)$$

Figure 7:
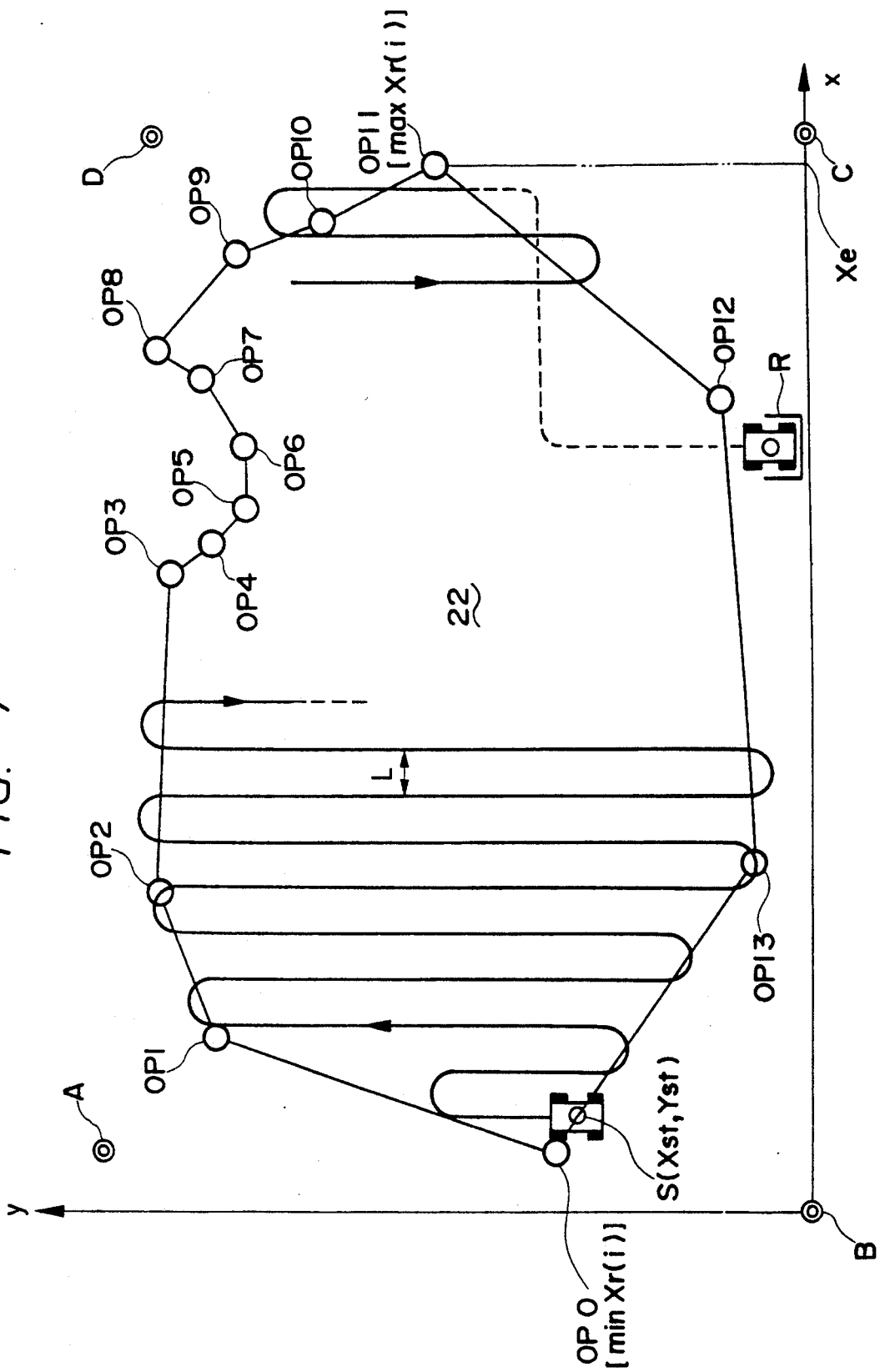
FIG. 7 is a diagram showing an example of the arrangement of the traveling course and the reference points.

Next, the steering control of moving vehicle i in the work area 22 which is recognized by the above described procedure is explained. FIG. 7 is a diagram showing the arrangement of the traveling course of moving vehicle I and reference points A-D, and FIG. 10 is a flowchart of the steering control process.

In FIG. 7, the reflectors 6a-6d are located at reference points A. B, C and D, respectively. In the work area 22, a zigzag traveling course is established which consists of a plurality of straight line courses that are in parallel with the Y-axis and have a spacing of L there between, and turning courses connecting two straight line courses adjacent to each Other.

Figure 10:
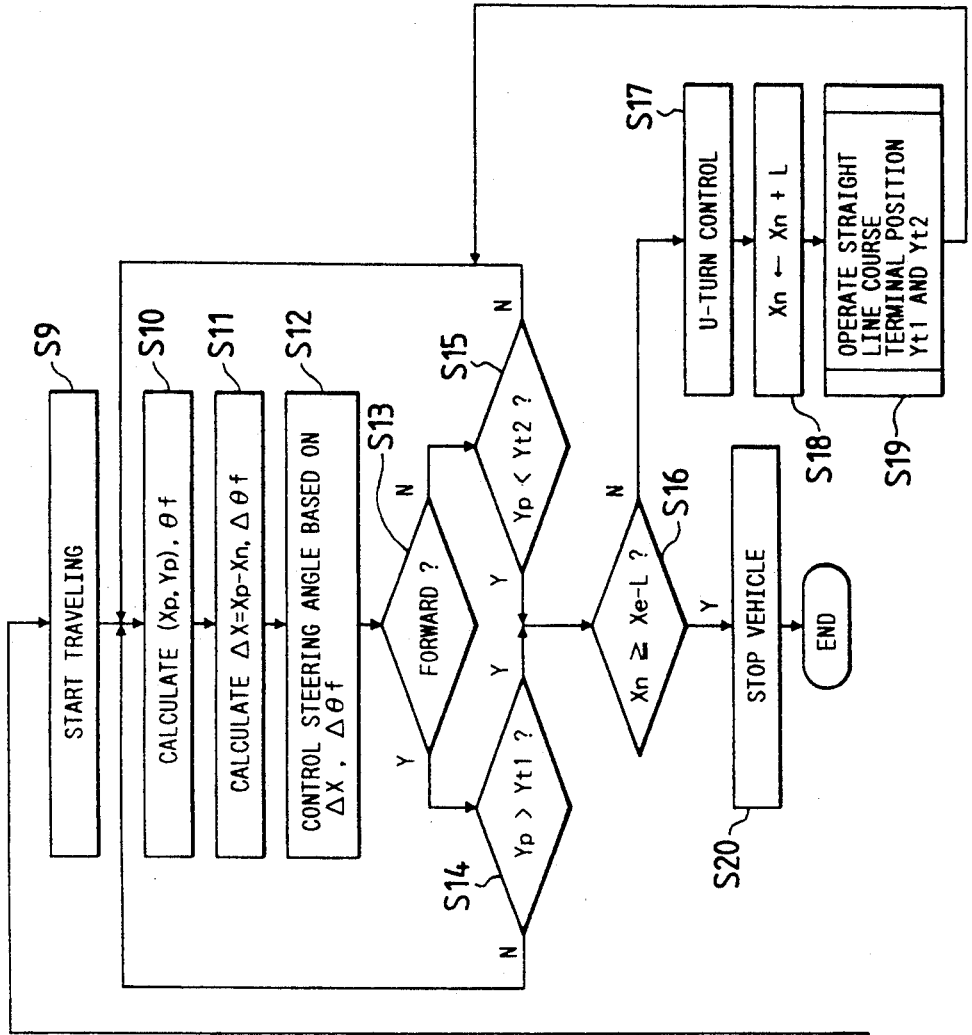
FIG. 10 is a flowchart of the steering control.

In the figure, each of points OP0-OP13 represents the position at which the detected position of moving retroreflective means OP has been stored in the work area recognition processing, and point S represents the position at which the work is to be started As shown, position B of the moving retroreflective means OP are stored only at the point at which the work area recognition is started and the points at which the moving direction of the moving retroreflective means is changed The control procedure is described according to the flowchart of FIG. 10.

In step S1, it is determined whether or not the recognition processing of the work area is necessary. The determination of the step S1 is made on the basis of opening or closing of an operation switch (not shown) for work area recognition. For the work in an already stored area, the determination result becomes negative, and steps S2 and S3 are skipped and the operation proceeds to step S4.

For the work in an area which has not yet been recognized or stored, the operation goes to step S2 where the self position P(Xp, Yp) and front direction Of of the moving vehicle 1 are calculated.

In step S3, the recognition processing of the work area is performed according to the flowchart shown in FIG. 8.

In step S4, the first Straight line course for travel is set. That is, as the X coordinate Xn of the first straight line course, the sum of the minimum value of the X-coordinates of the stored positions of the moving retroreflective means Op and a constant "a" is set. The constant "a" is of a value smaller than distance L between each straight line course (for instance, L/2), and it depends on the width of moving vehicle 1, the type of the work and the like. However, the coordinate value Xn is preferably set at some larger value, when the length of the straight line course becomes excessively short as a result of that the minimum value of the X-coordinates of the positions of the moving retroreflective means OP is used as the X-coordinate Xn of the first straight line course.

In step S5, two terminal points Yt1 and Yt2 at which the first straight line course intersects with the outline of the work area 22 are calculated One terminal position Yt2 of the first straight line course is the Y coordinate Yst of the work start position. The calculation in :his step is performed according to the flowchart shown in FIG. 9.

In step S6, the work start position is set.

In step S7, the maximum value of the X-coordinates of the positions of the moving retroreflective means OP is set as the work end position.

When the recognition of the work area, and the determination of the work start and end positions are performed, in step S8 the moving vehicle 1 is moved to the work start position S(Xst, Yst) automatically or by appropriate means such as radio control.

When starting the travel of the moving vehicle 1 in step S9, the moving vehicle 1 calculates the current position (Xp, Yp) and the advance direction Of thereof in step S10.

In step S11, a deviation amount ($\Delta X = Xp - Xn$, $\Delta \theta f$) of the traveling course TC is calculated, and a steering angle :s controlled by the steering means in response to the amount of deviation calculated in step S12.

In step S13, it is judged that either the moving vehicle 1 is traveling away from the origin (forward direction) or is approaching the origin (reverse direction) in the y-axial direction.

In the case of forward direction, it is Judged whether one stroke is finished (Yp>Yt1) or not in step S14, while in the case of reverse direction, it is judged whether one stroke is finished (Yp<Yt2) or not in step S15. When it is judged that such one stroke is not finished in either step S14 or step S15, processing is returned to step S10.

In the case where it is judged that such one stroke is finished in either step S14 or S15 it is judged in the following step S16 whether all of the strokes are finished ($Xn \geq Xe - L$) or not.

When all the strokes are not finished the procedure shifts from step S16 to step S17 to effect U-turn control of the automated vehicle 1.

In step S18, a pitch L is added to Xn thereby calculating (Xn+L) and as a result, the following traveling course is set. When the following straight line course has been set, in step S19, the Y-coordinates of the terminal positions of the following straight line course are calculated in the manner similar to the step S5. After the Y-coordinates of the terminal positions have been calculated, the control is returned to step S10.

When the whole course has been finished, the traveling is stopped (step S20). It is also possible that the coordinate of the return position R of the moving vehicle 1 is previously inputted and, when the whole course has been finished, the moving vehicle 1 is made to travel to the return position R as necessary.

The U-turn control in step S17 does not rely upon the processings of steps S10-S12 wherein the positional information of the moving vehicle 1 calculated in the position advance direction operating means 13 is fed back to the steering means 14, but is effected in accordance with any suitable known program which has been previously set. In other words, control for steering of the moving vehicle is carried out in accordance with feedback control inside the working area 22, while control for turning a traveling direction of the moving vehicle is effected according to program control.

In addition, to simplify the control of transfer between turning courses and straight line courses, as the Y-coordinate for the starting position of a particular straight line course, the Y-coordinate of the terminal position of the preceding straight line course may be used. This simplifies the U-turn control when there is a relatively large difference between two Y-coordinates of the terminal position of the preceding straight line course and the starting position of the particular straight line course.

As described above, in the present embodiment, positions of the retroreflective means moving along the outer periphery of the work area are detected by the light emitting means and light receiving means mounted on the moving vehicle 1 with moving vehicle 1 being stopped, thereby recognizing the moving locus of the moving retroreflective means or the outline of the work area. In this way, the respective terminal positions of a plurality of traveling courses set in parallel with each Other with a spacing L therebetween in the work area whose outline has been recognized are calculated and determined from the stored data of the locus of the moving retroreflective means, and the moving vehicle is made to travel On the traveling course.

In the present embodiment, the position of each reference point A-D is first set on the primitive coordinate system with the position of the moving vehicle as the origin, then the primitive coordinate system is coordinate-transformed to set a coordinate system with one of :he reference points (for example, B) as the origin, and the respective points of the operator or retroreflective means moving along the outline are detected on the latter coordinate system.

In the present invention, however, it is also possible that, instead of performing such coordinate transformation, after measuring the distances and relative position al relationships between the respective reference points to determine a coordinate system with reference point B as the origin, the position of moving vehicle 1 is detected on this coordinate system.

It is also allowed that, after detecting the positions of the retroreflective means at various points on the outline on the primitive coordinate system to recognize the work area, the positions of the respective reference point S A-D are detected, and they are coordinate-transformed to a coordinate system with one reference point of the reference points A-D, for instance point B, as the origin.

In addition, although the operator moves carrying the retroreflective means in the present embodiment, the way of moving the retroreflective means is nor limited to this, and it is also possible that, for instance, the retroreflective means is mounted on a traveling vehicle and the operator drives the vehicle to move around the work area.

As apparent from the foregoing, the following effects are obtained in accordance with the present invention.

(1) Even if the work area has a complex geometry, it is nor necessary to place a lot of reflecting means for the area recognition. That is, only one movable reflecting means is needed for recognizing the outline of the work area and, in addition, since the reflecting means can be removed when the steering control of the moving vehicle is performed, there is no possibility that the detection of the reference points in the steering control becomes complex because of interruption by many reflecting means set for the work area recognition as was in the prior art (2) Since it is not needed to make the moving vehicle itself travel for recognizing the work area, no radio control operation requiring skill is necessary

What is claimed is:

1. In a system of the type comprising a moving vehicle having light beam generating means thereon for scanning a light beam around said vehicle, a plurality of fixed position light reflectors located in spaced relation to one another outside of a work area for successively reflecting said light beam to a light receiver on said moving vehicle as said light beam is scanned around said vehicle, and means on said moving vehicle responsive to signals from said light receiver for controlling the steering of said moving vehicle relative to said fixed position reflectors as said vehicle moves along a traveling course in said work area to perform a working operation in said work area, the improvement comprising a system, operable while said vehicle is stationary and prior to the commencement of said working operation, for defining the desired peripheral outline of said work area and for setting a traveling course of the moving vehicle in said work area, comprising:

movable light-reflecting means, separate from said fixed light reflectors, which is moved sequentially to successive positions along the peripheral outline of the work area to be defined, said moving light reflecting means being operative to reflect light in the direction of incidence from said light beam generating means as said light beam is scanned around the stationary vehicle, means for detecting the distance between the moving light-reflecting means and the stationary vehicle and the azimuth of the moving light-reflecting means relative to the stationary vehicle on the basis of the light reflected from the moving light-reflecting means, means for calculating successive positions of the moving light-reflecting means on a two-dimensional coordinate system having X and Y coordinate axes, said calculations being based on successive distances between said moving light-reflecting means and said stationary vehicle and successive azimuths of the moving light-reflecting means relative to the vehicle detected while the moving vehicle is stopped, and means for storing the successive calculated positions as a locus thereof to define the peripheral outline of the work area on said two-dimensional coordinate system, and means for setting the traveling course of the moving vehicle in the work area defined on the basis of said stored locus of positions of the moving light-reflecting means.

2. A system as claimed in claim 1, wherein a calculated position of the light-reflecting means is stored in the means for storing if the moving light-reflecting means has moved along the outline more than a predetermined value 3. A system as claimed in claim 1 further comprising means for calculating an equation of a straight line passing through two successive detected positions of the light-reflecting means, wherein if a current position of the light-reflecting means detected thereafter substantially exists on the straight line, the latest stored position is renewed with the current position, and if the current position of the light-reflecting means does not substantially exist on the straight line, the current position of the light-reflecting means is stored, leaving the latest stored position as it is.

4. A system as claimed in claim 1, wherein if the position of the moving light reflecting means detected after a plurality of detected positions of said light-reflecting means have been stored is within a predetermined distance range centering around the position at which said light-reflecting means has begun to move, the position al detection of the light reflecting means is finished.

5. A system as claimed in claim 1, wherein the calculation of each successive position of the light-reflecting means is performed on a preset coordinate system.

6. A system as claimed in claim 5, wherein the coordinate system is such that one coordinate axis is a line passing through two of three reference points corresponding respectively to the positions of said fixed position light reflectors placed at at least three locations remote from the moving vehicle and outside of the peripheral outline of the work area.

7. A system as claimed in claim 6, wherein the coordinate system is a coordinate system with the line passing through two of the three reference points as one coordinate axis which has been coordinate-transformed, after determining the positions of the reference points on a primitive coordinate system with the moving vehicle as the origin.

8. A system as claimed in claim 1, wherein said means for setting a traveling course in the work area is operative to set the position defined by the minimum or maximum value of the x-coordinates of said stored calculated positions as the starting position of the working operation.

9. A system as claimed in claim 1, wherein the traveling course consists of a plurality Of straight line courses set in parallel with the Y-axis and turning courses for connecting them, and the two Y-coordinates of both end positions of each straight line courses are defined by each of the Y-coordinates of the two points interpolatively calculated based on two position on the outline, which have been stored immediately before and after the straight line course, with said two positions being on opposite sides of the Straight line course.

10. A system as claimed in claim 9, wherein as the Y-coordinate for a starting position of a particular straight line course, the Y coordinate of a terminal position of an immediately preceding straight line course is used.

* * * * *